United States Patent [19]
Kloian

[11] Patent Number: 5,839,868
[45] Date of Patent: Nov. 24, 1998

[54] TEARABLE RETAINER

[76] Inventor: Harvey V. Kloian, 3521 W. Elmwood Ave, Wilmette, Ill. 60191

[21] Appl. No.: 893,025

[22] Filed: Jul. 15, 1997

[51] Int. Cl.$^6$ .............................. F16B 21/18; F16B 43/00
[52] U.S. Cl. ......................... 411/533; 411/526; 411/905; 411/999
[58] Field of Search ..................................... 411/533, 525, 411/526, 527, 905, 999, 970, 512, 517

[56] References Cited

U.S. PATENT DOCUMENTS

| | | | |
|---|---|---|---|
| 746,006 | 12/1903 | Brigham . | |
| 1,037,010 | 8/1912 | Irons | 411/526 X |
| 3,084,958 | 4/1963 | Appleton | 411/999 X |
| 3,694,013 | 9/1972 | Heitner | 411/999 X |
| 4,530,629 | 7/1985 | Sakow | 411/533 X |
| 5,452,944 | 9/1995 | Bear . | |

*Primary Examiner*—Neill R. Wilson
*Attorney, Agent, or Firm*—Rudnick & Wolfe

[57] ABSTRACT

A tearable and disposable retainer for temporarily holding and positioning an apertured element such as a washer in place along the length of an elongated, generally cylindrical part. The retainer of the present invention includes a singular, generally planar member made from a manually tearable material. The retainer member defines a generally centralized hole or opening with a series of cuts or slits radially extending therefrom. A series of angularly shaped segments are defined between the slits, with each angularly shaped segment having a formed arcuate edge at a distal end thereof for frictionally engaging the outer cylindrical surface of the part over which the washer is loosely fitted.

19 Claims, 1 Drawing Sheet

TEARABLE RETAINER

FIELD OF THE INVENTION

The present invention generally relates to retainers and, more particularly, to a tearable retainer which fits over an elongated cylindrically shaped piece for temporarily holding parts in position.

BACKGROUND OF THE INVENTION

Cylindrically shaped parts or elements such as elongated rods, threaded fasteners, or studs often have apertured planar washers or other elements arranged thereabout and therealong. As is well known, thrust washers, lock washers, spacers and the like are often loosely fitted about a threaded parts and are used in a wide variety of industries. Typically, such cylindrically shaped and threaded parts, along with the washers or elements loosely fitted thereabout, are joined to other pieces or parts thereby forming a larger assembly.

As will be appreciated, movement or displacement of the cylindrically shaped parts or pieces often results in misplacement and sometimes loss of the washers loosely fitted thereabout. Moreover, when the elongated threaded part or piece is disposed in a depending or downwardly directed arrangement, gravity tends to automatically displace the washer from about the elongated threaded piece.

Space constraints often exacerbate the problem. That is, in certain situations, the space provided beneath the depending elongated threaded part simply does not allow sufficient space to manually position and hold a part such as an apertured washer in place. Alternatively, some designs include a multitude of downwardly disposed threaded parts and an operator may not have sufficient hands or help to hold all the washers or elements loosely fitted about the threaded parts in place. As will be appreciated, when the washer or element which is loosely fitted about the elongated part is manually released, to enable alignment of the threaded part or piece relative to a bore or opening in an adjacent part, the washer or element typically falls from the elongated member as a result of gravity thereby adding frustration to an already difficult task. As will be appreciated, the inadvertent loss or misplacement of one or more pieces can add time to the completion of the task, or, in certain circumstances, incorrect assembly procedures.

Some mechanics and technicians will tend to add a grease coating or adhesive to the planar face of the washer thereby temporarily holding it in place. Some situations, however, are not conducive to the use of grease or adhesive. In fact, in certain situations, grease or adhesive may contaminate or destructively react with other parts of the larger assembly. Thus, using grease or adhesive as a holding technique is not always a suitable solution to the problem.

Other forms of retainers, such as snap rings, or O-rings are also known in the art. These retainers, however, are usually intended to remain as part of the larger assembly. Moreover, the use of snap rings or O-rings and similar holding devices typically require additional machining operations to the elongated threaded part to accommodate the snap ring or O-ring along the length thereof, thus adding to the cost of the larger assembly. Additionally, there are some situations wherein it is desirable for the retainer, used to hold the washer in place, to be of a temporary design. That is, after the retainer serves its function of holding a part in place, it should be readily removable from about the elongated member. Rubber or elastomer O-rings and the like are not readily removable.

Additionally, certain operating conditions do not necessarily lend themselves to the retainer being retained about the elongated member. Of course, in those situations where the retainer can remain in place, the retainer should be formed from a material which permits it to remain in place, if desired.

Thus, there is a need and a desire for a retainer which is adapted for use with elongated cylindrically shaped parts of widely varying diameters and which is easily removable, if warranted, from about the threaded member and furthermore which inhibits contamination of the larger assembly.

SUMMARY OF THE INVENTION

In view of the above, and in accordance with the present invention, there is provided a tearable and disposable retainer for temporarily positioning and holding an apertured element such as a washer and the like in place along the length of an elongated, generally cylindrically-shaped part such as a threaded stud or the like. The retainer of the present invention includes a generally planar member made from a manually tearable material. The retainer member is formed with a generally centralized circular opening extending through the member for allowing the member to be easily and readily positioned along the length of the generally cylindrically-shaped part regardless of the diameter of the cylindrically shaped part. The member includes a series of cuts or slits which intercept within and radially extend from the periphery of the centralized opening defined by the retainer member.

The retainer member defines a series of angularly shaped segments defined between adjacent slits at the periphery of the centralized opening. Each angularly shaped segment defines an arcuate surface or edge at a distal end thereof for frictionally engaging the exterior surface of the elongated cylindrically shaped member, thus, allowing the retainer member to functionally and effectively hold elements such as washers and the like disposed thereabove in position along the length of the threaded part thereby facilitating assembly of the device having the elongated threaded parts extending therefrom to other parts of the larger assembly.

The retainer is typically formed from paper such that it is economical and readily disposable. It has been found that forming the retainer member from paper readily promotes manual tearing of the retainer from the elongated threaded part after the elongated and cylindrically shaped part has been operably positioned or assembled to, or in combination with, additional parts or elements forming a larger assembly. Of course, suitable plastics or any nylon-like material which readily tears apart in response to an adequate pulling force being exerted thereupon can equally suffice.

In a preferred form of the invention, the retainer member is only about 0.003 inches to about 0.007 inches in thickness. Notably, the retainer is not intended to be used to distribute forces across a larger area and is not compressible. Instead, the retainer member of the present invention is intended simply to temporarily hold elements such as a washer in place. After the threaded stud is operably positioned as required, the retainer member of the present invention is torn from about the elongated generally-shaped element and disposed of. It should be appreciated, however, the present invention does not necessarily have to be torn or separated from the elongated stud or threaded member. In fact, and because of its relatively thin non-compressible form, the retainer member can remain about the stud or shaft with substantially no harmful results to the larger assembly.

In one form of the invention, the retainer member has a circular periphery. In this form of the invention, the slits extending away from the centralized opening each have a length measuring approximately 25% to about 33% of the diameter of the member. In a preferred form of the invention, the slits are equally spaced relative to each other and are of a substantially common or equal length. In most preferred form of the invention, the retainer member has four equally-spaced slits extending radially from the periphery of the centralized opening.

To facilitate removal of the retainer from about the elongated generally cylindrical threaded member, an alternative form of the invention involves forming the periphery of the retainer member with at least three corners. By such design, the configuration of the retainer member will likely project beyond the diameter of the washer or the like element positioned thereby, thus, promoting manual grasping of a corner of the retainer member. In this regard, suitable indicia may be provided on the retainer member to indicate where the retainer member should be grasped to promote tearing thereof. In this form of the invention, extending the slits radially extending from the centralized opening toward the corners of the periphery of the retainer member has been found to promote tearing of the retainer member from about the threaded member.

In a preferred form of the present invention, the retainer member can also include suitably formed crease lines radially extending outwardly from the centralized opening to add strength and rigidity to the retainer member. That is, it has been found that the crease or fold lines serve to increase the frictional contact of the arcuate segment relative the outside diameter of the cylindrically shaped member by inhibiting the retainer member from bending as it passes over the exterior surface of the threaded part.

Storage and easy access to the retainer members is also a concern addressed by the present invention. In some instances, and depending upon the weight of the washer or element to be retained along the length of the cylindrically shaped part, one retainer member may suffice. In other instances, and to enhance the retentative ability of the present invention, more than one retainer member may be used in combination with each other. Accordingly, the present invention is configured such that the retainer members can be arranged in releasable and stackable relationship relative to each other such that one or more retainer members can be readily grasped when required.

In this regard, each retainer member includes adhesive on one major surface for releasably holding the retainer members in overlying relationship relative to each other to form a stack of retainers. Preferably, the adhesive is applied in a strip form adjacent the periphery of the retainer member. The adhesive used to releasably hold the retainers in stacked relationship relative to each other is preferably a pressure sensitive type adhesive which permits removal of one retainer member from the stack with substantially no residue adhesive being left deposited on the major surface of the underlying retainer member.

These and other objects, aims, and advantages of the present invention would be readily appreciated from the following detailed description, the appended claims, and the drawings.

DETAILED DESCRIPTION OF THE DRAWINGS

DESCRIPTION OF THE PRESENT INVENTION

Figure 1:
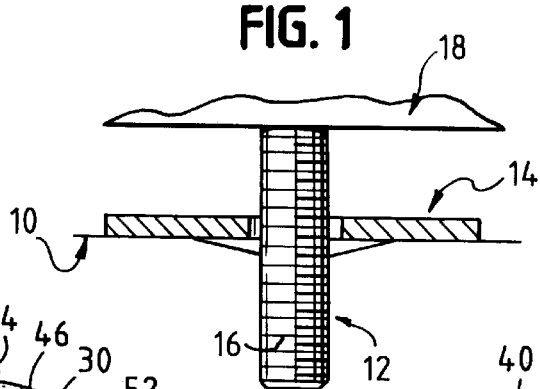
FIG. 1 is a schematic side elevational view of the present invention arranged to hold an apertured element along the length of an elongated and generally cylindrically shaped and threaded part.

While the present invention is susceptible of embodiment in various forms, there is shown in the drawings, and will hereinafter be described preferred embodiments of the invention with the understanding that the present disclosure is to be considered as setting forth exemplifications of the invention which are not intended to limit the invention to the specific embodiments illustrated.

Referring to FIG. 1, the retainer of the present invention is represented by reference numeral 10 and is shown arranged in combination with an elongated generally cylindrical piece or part 12 and beneath an apertured element such as a conventional relatively thin but rigid washer or element 14 having no significant weight but is conventionally used about an elongated threaded member such as 12 for various purposes well known in the art. In FIG. 1, the cylindrical piece or part 12 is illustrating as having external threading 16 extending along the length thereof. Moreover, in FIG. 1, the cylindrical piece or part 12 is shown as depending from and forming part of a larger assembly 18.

Figure 2:
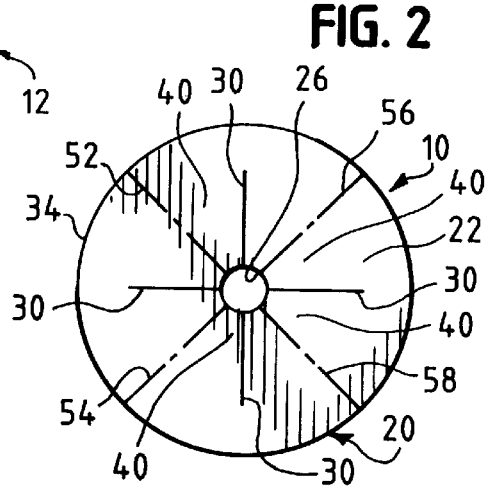
FIG. 2 is a top plan view of the present invention.
Figure 3:
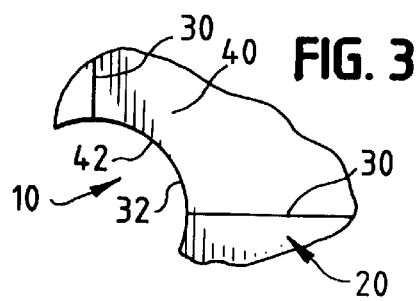
FIG. 3 is a fragmentary enlarged elevational view of a centralized portion of the present invention.

Turning to FIG. 2, the retainer 10 is shown as including a single and generally planar member 20. As shown in FIGS. 2 and 3, member 20 includes upper and lower major surfaces 22 and 24, respectively. Member 20 is preferably formed from a tearable or separatable paper material having a thickness ranging between about 0.003 inches to about 0.007 inches. In a most preferred form of the invention, the retainer member 20 is formed from the same type of paper material used in connection with self-sticking removable notes sold by 3M Commercial Office Supply Division of St. Paul, Minn. under the registered trademark "Post-It." As will be appreciated, other suitable forms of tearable or separatable material including a plastic or nylon material which can be readily torn or separated in response to a pulling force exerted thereon can equally suffice.

Member 20 of retainer 10 defines a generally central round hole or opening 26 extending completely through member 20. In a preferred form of the invention, opening 26 is sized such that it is proportional to a range of outside diameters of the shaft or part 12 which it is intended to be arranged in combination with. For example, for shafts or rods 12 having an outside diameter ranging between about 0.125 inches and about 0.250 inches, opening 26 in retainer 20 can be sized with a hole or opening 26 having about a 0.062 diameter. For shafts 12 having an outside diameter ranging between about 0.250 inches and about 0.375 inches, the opening 26 of member 20 of retainer 10 can have about a 0.125 inch diameter. Furthermore, for shafts 12 having an outside diameter ranging between about 0.375 inches and about 0.625 inches, opening 26 in member 20 of retainer 10 will preferably be sized with about a 0.250 inch diameter.

Member 20 of retainer 10 further includes a series of cuts or slits 30. In the illustrated form of the invention, each slit or cut 30 intersects with and radially extends outwardly from a peripheral edge 32 defined by opening 26 of retainer member 20. In the illustrated embodiment of the invention, the retainer member 20 has four slits 30 radially extending from the opening 26. It should be appreciated, however, that a more or less number of slits 30 could be provided without detracting or departing from the spirit and scope of the present invention. Moreover, and in a preferred from of the invention, the slits 30 extending radially from the opening 26 are equally disposed relative to each other and are of equal length relative to each other.

In the embodiment illustrated in FIGS. 2 and 3, retainer member 20 has a generally circular peripheral edge 34. In this embodiment, each slit 30 has a length ranging between about 25% to about 33% of the diameter of the retainer member 20.

As illustrated in FIG. 3, member 20 of retainer 10 further includes a plurality of angularly shaped or formed segments 40 defined between adjacent slits 30. Notably, each angularly shaped segment 40 has a arcuately shaped or curved surface 42 at the distal end thereof defined by the periphery 32 of the opening 26 for facilitating frictional engagement of the retainer 10 with the outer cylindrical surface of the part or shaft 12 thereby enhancing the ability of the retainer to position and hold element 14 in place.

Figure 4:
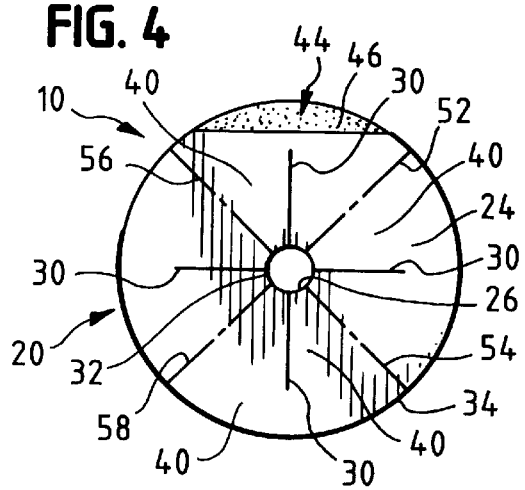
FIG. 4 is a bottom plan view of the present invention.
Figure 5:
FIG. 5 is a side elevational view of several pieces of the present invention arranged in a stacked relationship.

Turning to FIG. 4, the bottom or lower major surface 24 of member 20 has adhesive 44 provided thereon to promote self-sticking arrangement of a series of members 20 in a stacked relationship relative to each other as shown in FIG. 5. In the illustrated form of the invention, the adhesive 44 is applied in a strip form 46 toward the peripheral edge 34 of retainer member 20. In a most preferred form of the invention, the adhesive 44 is a conventional pressure sensitive adhesive of the type used in connection with the "Post-It" removable notes mentioned above which readily permits removal of one or more of the members 20 from a stack of members 48 (FIG. 5) with substantially no residual adhesive remaining on the upper surface 22 of the adjacent retainer member 20.

In a one form of the invention, and as schematically indicated in FIGS. 2 and 3, a plurality of crease or fold lines 52, 54, 56 and 58, as illustrated in dash lines in the drawings, radially extend outwardly from the periphery 32 of the centralized opening 26 defined by retainer member 20 for adding rigidity to the retainer 10. In the most preferred from of the invention, the crease lines extend across the diameter of the retainer member 20. As known in the art, the crease lines 52, 54, 56 and 58 can be formed or imparted to the retainer member 20 by pressing blunted edges of a suitably configured die (not shown) against a stack of retainer members 20. As shown in the drawings, the crease lines 52, 54, 56 and 58 are shown to extend in diverging relation relative to each other and between the adjacent cuts or slits 30 provided on each retainer member 20.

Figure 7:
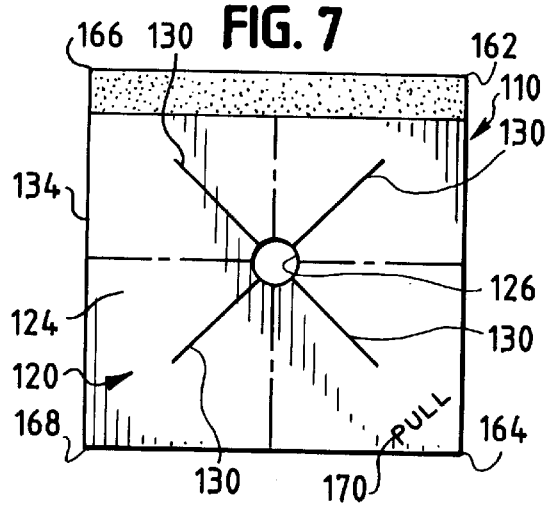
FIG. 7 is a bottom plan view of the alternative form of the present invention.
Figure 6:
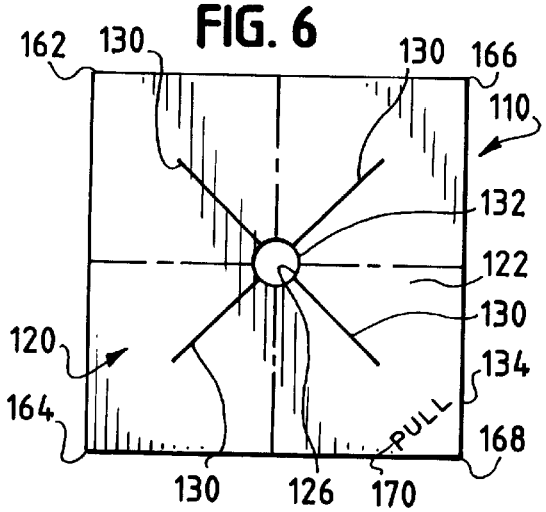
FIG. 6 is a top plan view of an alternative form of the present invention.
Figure 8:
FIG. 8 is a side elevational view similar to FIG. 5 illustrating several pieces of the present invention in a stacked relationship relative to each other.

A second embodiment of retainer embodying features of the present invention is schematically illustrated in FIGS. 6 through 8. This alternative form of retainer is designated generally by reference numeral 110. The elements of this alternative form of retainer that are identical to or functionally analogous to those features discussed above regarding retainer 10 are designated by reference numerals identical to those used above with the exception that this embodiment uses reference numerals in the 100 series.

In this embodiment of the invention, the single, generally planar member 120 of retainer member 120 is substantially similar to that discussed above except the periphery 134 of retainer member 120 is rectangularly configured with corners 160, 162, 164 and 166. Although illustrated with a generally rectangular outer periphery 134, it should be appreciated the outer periphery 134 could include three corners or more than the four corners illustrated without detracting or departing from the spirit sand scope of then present invention. As will be appreciated, when member/20 of retainer/10 is configured with at least three corners, it is likely the corners will project beyond the outer periphery of the washer 14 thereby enhancing the ability of a person to grasp and tear the retainer/10 when it is to be removed from about the cylindrically shaped element 12.

Like the embodiment discussed above, the retainer member 120 is likewise provided with a plurality of slits 130 intersecting with and radially extending outwardly from the periphery 132 of a centralized opening 126 defined by retaining member 120. It has been found, however, when the slits or cuts 130 on the retainer member 120 are directed to extend toward the corners 160, 162, 164 and 166, the ability of the retainer member 120 to tear or separate in response to a pulling force being exerted thereon is enhanced. Moreover, it has been found that directing the slits or cuts 130 to angularly extend toward the corners 160, 162, 164 and 166 lessens the pulling force required to effect tearing or separation of the retainer member 120 from about the cylindrically shaped exterior surface of the elongated shaft or part 12.

In the embodiment of the invention illustrated in FIGS. 6 and 7, suitable indicia 170 is provided on the major surfaces 122 and 124 of the retainer member 120 for providing a visual indicator from whence the retainer member should be pulled operably effect a tearing or ripping function if the retainer 10 from about the elongated shaft or stud 12. In line with that discussed above, the indicia 170 is preferably arranged adjacent to one or more of the corners 160, 162, 164 and 166 on the upper and lower major surfaces 122, 124 to effect efficient and effective tearing of the retainer in response to,man adequate pulling force being imparted thereto.

Although a complete understanding is readily available from the above disclosure, a review of the how the present invention finds utility in the industry will now be additionally provided. That embodiment of the invention illustrated in FIGS. 1 through 5 will be set forth in explanation, with the understanding the embodiment of the invention set forth in FIGS. 6 through 8 is substantially similar thereto.

As shown in FIG. 1, the apertured washer or element 14 is loosely placed over and along the elongated cylindrically shaped stud or threaded member 12 as is conventional and well known in the art. Thereafter, the retainer 10 of the present invention is slipped onto and over the free end of the cylindrically shaped member 12. Notably, the centralized hole or opening 26 in the retainer member 20, especially when considering its proportional sizing to the outside diameter of the shaft or elongated part 12, facilitates fitting the retainer 10 over the free end of the cylindrical outer surface of part 12. As will be appreciated, the retainer 10 can be slidably positioned anywhere along the length of the elongated part 12 that suits the needs of the user.

Once the retainer is positioned along the length of the part 12, the retainer 10 serves to prevent the washer or element 145 from moving therepast. Accordingly, once the retainer 10 is fitted about the part 12 beneath the washer or element 14, the operator can turn their attention to other elongated members which need to be fitted with washers or elements without concern that the washer or element positioned above the retainer 10 will remain in place and not be able to become inadvertently lost or displaced during movement of the assembly 18.

After the retainer is fitted about the part 12, the arcuate engaging surfaces 42 of the plurality of segments 40 defined by the retainer 10 serve to fictionally engage as by wedging against the outer cylindrical surface of the part 12 thereby releasably locking the retainer 10 to the part 12. As will be appreciated, the arcuate engaging surface 42 of the segments 40 is arranged substantially concentric to the outer cylindrical surface of the part 12 thereby enhancing the holding power of the retainer 10. Moreover, If the exterior cylindrical surface of the part 12 has external threading as indicated by reference numeral 16 in FIG. 1, the relative thinness of the retainer 10 permits the arcuate engaging surfaces 42 of the various segments 40 defined by the retainer 10 to operably engage the root diameter of the external threading 16, thus, further enhancing the holding capacity of the retainer 10.

The ability of the arcuate surfaces 42 of the various segments 40 to fictionally engage the outer cylindrical surface of the part 12 is further enhanced by the crease lines 144, 146 added to the retainer 10. As will be appreciated, and albeit preferably sized relative to the outer diameter of the part 12, the diameter of the centralized hole or opening 26 in the retainer is less than the outside diameter of the shaft or part 12. Accordingly, the segments 40 of the retainer will normally deflect when the retainer 10 is positioned about the part 12. Adding the crease lines 44 and 46 to the retainer serves to limit the deflection of the angular segments and adds rigidity thereto thus enhancing the holding power of the retainer 10 against the outside diameter of the part 12.

Of course, in some instances, one than one retainer 10 will be used in combination relative to each other. As such, the retainers 10 of the present invention are preferably arranged in stacked relationship relative to each other as shown in FIGS. 5 and 8. The adhesive 38 on one of the major surfaces of the retainer readily holds the retainers relative to each other. Thus, when one or more than one retainer 10 is required, the required number of retainers is simply peeled off the stack and positioned over the part 12 for holding the element 14 in place.

After the part 12 is positioned, as desired, the retainer 10 may either be torn away from the part 12 or, because of its relative thinness can remain in place. The material from which the retainer 10 is formed should not pose a significant problem of contamination if it should remain in place situated about the shaft 12 when the part 12 is assembled. On the other hand, the retainer 10 of the present invention is specifically designed to be readily torn or separated from the part 12. To accomplish such ends, a manual pulling force is exerted against the retainer 10 which causes it to separate from the part 12 without use of tools or an overextended manual effort. As will be appreciated, the cuts or slits 30 facilitated tearing or ripping of the retainer 10 from about the shaft 12.

In the multicornered embodiment of the invention illustrated in FIGS. 6 and 7, the presence of the corners 150, 152 and 154 significantly add to the surface area of the retainer 110 thereby assuring peripheral edges thereof will extend beyond the periphery of the washer or element 14 to be positioned by the retainer 110. Furthermore, positioning the slits 130 to extend in a direction toward the corners 150, 152, 154 and 156 facilitates tearing of the retainer 110 from about the shaft 12. Moreover, the indicia 160 provided on one or both of the major surfaces 122, 124 of the retainer 110 provide a clear indication of where the pulling force is bet to be exerted.

The thinness of the retainer of the present invention allows it to be manufactured inexpensively and permits ready disposal of the retainer. A significant advantage of the present invention is that no addition machining operation need to be provided on the part 12 to hold the washer or element in place. Moreover, the retainer of the present invention serves to free the operator to accomplish other ends rather than having to forcibly hold the washer inn place about the shaft. Furthermore, once the retainer of the present invention is positioned about the shaft concerns over inadvertent displacement of the washer or element are significantly reduced. Additionally, assembly procedures are enhanced since the likelihood of the washer becoming displaced relative to the shaft is significantly reduced.

From the foregoing it will be observed that numerous modifications and variations can be effected without departing or detracting from the true spirit and scope of the novel concept of the present invention. It will be appreciated that the present disclosure is intended to set forth exemplifications of the invention which are not intended to limit the invention to the specific embodiments illustrated. The disclosure is intended to cover by the appended claims all such modifications as fall within the spirit and scope of the claims.

What is claimed is:

1. A tearable retainer for temporarily retaining and positioning a washer along the length of a threaded element, said retainer comprising:

a generally planar member formed from a manually tearable material, said member defining a generally centralized circular opening whose periphery is defined within the periphery of said member, said member including a plurality of equal length slits cut into said member, and wherein said member further defines a plurality of arcuately formed segments defined between adjacent slits at the periphery of said opening for slidably engaging an exterior surface of said threaded element beneath said washer thereby retaining said washer along the length of said threaded element, and wherein at least one major surface of said member includes adhesive for releasably holding a stack of members in an overlying relationship relative to each other prior to use, said adhesive permitting removal of one of said members from the stack.

2. The tearable retainer according to claim 1 wherein the material said planar member is formed of is paper.

3. The tearable retainer according to claim 1 wherein said member has a generally circular periphery.

4. The tearable retainer according to claim 1 wherein each slit has a length ranging between about 25% to about 33% of the diameter of said member.

5. The tearable retainer according to claim 1 wherein said member defines four equally spaced slits extending radially away from the periphery of said opening.

6. The tearable retainer according to claim 1 wherein said planar member has a material thickness ranging between about 0.003 inches and about 0.007 inches.

7. A retainer for retaining and positioning an apertured element along the length of an elongated generally cylindrically shaped member, said member comprising:

a generally planar member made from a manually tearable material, said member having formed therein a generally centralized circular opening extending through said member for allowing said member to be slidably positioned anywhere along the length of said cylindrically shaped member, wherein said member includes a series of cuts intersecting with and radially extending substantially equal lengths away from a periphery of said opening towards a periphery of said member for facilitating tearing of said member from about said cylindrically shaped member, and wherein at least one major surface of said member includes adhesive for releasably holding said members in an overlying relationship relative to each other thereby forming a stack of members, said adhesive permitting removal of one of said members from the stack.

8. The tearable retainer according to claim 7 wherein the material said planar member is formed of is selected from the class consisting of: paper, plastic, nylon.

9. The tearable retainer according to claim 7 wherein said mepmber has a generally circular periphery.

10. The tearable retainer according to claim 7 wherein each slit has a length ranging between about 25% to about 33% of the diameter of said member.

11. The tearable retainer according to claim 7 wherein said member defines four equally spaced slits extending radially away from the periphery of said opening.

12. The tearable retainer according to claim 7 wherein said planar member has a material thickness ranging between about 0.003 inches and about 0.007 inches.

13. The tearable retainer according to claim 7 wherein indicia is imprinted and positioned on one major surface of said member for indicating where to exert a pulling force on the member to effect efficient tearing of the member from about the cylindrically shaped member.

14. A tearable retainer for temporarily retaining and positioning a washer along the length of a threaded element said retainer comprising:

a generally planar member formed from a manually tearable material, said member defining a periphery having at least three corners, said planar member being further characterized by a generally centralized circular opening whose periphery is defined within the periphery of said member, said member further including a plurality of equal length slits cut into said member, with each slit intersecting with and extending from the periphery of said centralized opening toward a corner on the periphery of said member, and wherein said member further defines a plurality of angularly shaped segments defined between adjacent slits at the periphery of said opening, each angularly shaped segment defining an arcuate engaging surface at a distal end thereof for slidably and fictionally engaging an exterior surface of said threaded element beneath said washer thereby retaining said washer along the length of said element.

15. The tearable retainer according to claim 14 wherein said member is formed from paper having a material thickness ranging between about 0.003 inches and about 0.005 inches in thickness.

16. The tearable retainer according to claim 14 wherein the periphery of said member has four corners thereon.

17. The tearable retainer according to claim 14 further including imprinted indicia positioned adjacent a corner of said member for indicating where to exert a pulling force on the member to effect efficient tearing of the member from about the threaded element.

18. The tearable retainer according to claim 14 wherein at least one major surface of said member includes adhesive for releasably holding said members in overlying relationship relative to each other thereby forming a stack of members, said adhesive permitting removal of one of said members from said stack with substantially no residue adhesive being left deposited on the major surface of the underlying member.

19. The tearable retainer according to claim 14 further including diverging crease lines radially extending from the centralized opening in the retainer for adding rigidity to the angularly shaped segments.

* * * * *